United States Patent [19]

Helterbrand

[11] Patent Number: 4,711,382

[45] Date of Patent: Dec. 8, 1987

[54] SPARE TIRE CARRIER

[76] Inventor: David L. Helterbrand, 3508 University Dr., Garland, Tex. 75043

[21] Appl. No.: 920,274

[22] Filed: Oct. 17, 1986

[51] Int. Cl.[4] .............................................. B62D 43/00
[52] U.S. Cl. .............................. 224/42.23; 224/42.12; 414/466
[58] Field of Search ............... 224/42.06, 42.12, 42.21, 224/42.23, 42.28, 42.29; 414/463–466

[56] References Cited

U.S. PATENT DOCUMENTS

| | | |
|---|---|---|
| 1,813,094 | 7/1931 | Appel . |
| 2,034,834 | 3/1936 | Robinson, Jr. . |
| 3,187,914 | 6/1965 | Peras . |
| 3,369,683 | 2/1968 | Richards . |
| 3,435,971 | 4/1969 | Powell . |
| 3,485,399 | 12/1969 | Hebnes . |
| 3,782,568 | 1/1974 | Alexander . |
| 3,904,093 | 9/1975 | Hanela . |
| 4,072,258 | 2/1978 | Cruson . |
| 4,093,088 | 6/1978 | Hildebrandt et al. . |
| 4,221,312 | 9/1980 | Wertjes . |
| 4,278,191 | 7/1981 | Mecham . |
| 4,312,620 | 1/1982 | Muschalek, Jr. . |
| 4,483,468 | 11/1984 | Lucas ........................... 224/42.21 X |
| 4,573,855 | 3/1986 | Braswell . |

Primary Examiner—Henry J. Recla
Assistant Examiner—Robert M. Petrik
Attorney, Agent, or Firm—Jerry W. Mills; Roger N. Chauza

[57] ABSTRACT

Disclosed is a spare tire carrier adapted for supporting a spare tire on an underside of a vehicle. The carrier comprises a pair of fixed track members attached to the vehicle underside for pivotably and slidably mounting a carriage adapted to receive the spare tire. Each of the tracks members has an inclined guide slot for receiving rollers and guide pins of the carriage. The rollers and guide pins are disposed in the guide slots and secured to the carriage approximately intermediate the front end and rear end of the carriage. The carriage is movable relative to the track members in the guide slots between a retracted elevated position and a projected lowered position enabling convenient access to the tire. An improved locking mechanism is disclosed comprising a rotatable carriage locking bar.

16 Claims, 17 Drawing Figures

SPARE TIRE CARRIER

TECHNICAL FIELD OF THE INVENTION

This invention relates generally to an apparatus for supporting a spare tire on a vehicle and, more particularly, to a carriage pivotably and slideably mounted on the underside of a vehicle for supporting a spare tire.

DESCRIPTION OF THE PRIOR ART

There are devices in common use, primarily on pickup trucks, for supporting a spare tire at the rearward end of the truck beneath the truck loading bed. Such devices generally include a carriage slideably and pivotably mounted at one end from the underside of the truck with the other end of the device detachably mounted.

A problem with some of these devices is that when the carriage is unfastened for removing a spare tire, the detached end is wholly unsupported and can fall to the ground under the weight of both the spare tire and the carriage. This can be quite dangerous for an operator who is required to be bent over at the rearward end of the truck with his hand inserted below the carriage for unfastening the detachable mounted end. Likewise, installation of a spare tire onto such a carriage is a strenuous job. The spare tire must be balanced on the carriage and lifted all the way from the ground to its retracted elevated position and supported while complicated fastening means are attached for securing the spare tire.

Examples of the above discussed devices include Appel, U.S. Pat. No. 1,813,094; Richards, U.S. Pat. No. 3,369,683; Powell, U.S. Pat. No. 3,435,971 and Alexander, U.S. Pat. No. 3,782,568.

U.S. Pat. No. 2,034,834 to Robinson, Jr. issued Mar. 24, 1936 also discloses a spare tire carrier having a carriage suspended from the top edge of a pair of runners by rollers. The problem with this apparatus is that the carriage may become derailed from the runners. Also, the Robinson carrier requires hinged extension runners to project the spare tire carriage sufficiently rearwardly.

U.S. Pat. No. 4,221,312 to Wertjes issued Sept. 9, 1980 discloses a tire mounting bracket which is pivotably mounted at a front end to the underside of a vehicle and includes chains for limiting the downward pivotable movement of the bracket at the rear end.

Though Wertjes supports the tire mounting bracket in the lowered position, the device does not project the bracket rearwardly to provide the operator with easy access to the spare tire. Additionally, Wertjes does not provide continuous controlled pivotable movement of the bracket between the elevated position and the lowered position. The operator is required after releasing a coupling to manually ease the bracket downwardly with the aid of a conventional tire iron.

The above spare tire carriers are undesirable in that they do not provide a controlled pivoting and sliding movement of a carriage between a retracted elevated position and a projected lowered position where the spare tire is conveniently accessible to the operator. Additionally, the above spare tire carriers are cumbersome because they lack a mechanism to quickly and conveniently lock and unlock the carriage with their supporting members.

IDENTIFICATIONS OF OBJECTS OF THE INVENTION

An object of the invention is to provide an improved tire carrier for vehicles.

It is another object of this invention to provide an apparatus which provides controlled pivoting and sliding movement of the carriage relative to the supporting track members between the retracted elevated position and the projected or extended lowered position.

It is another object of this invention to provide a spare tire carrier having means for quickly and easily securing the carriage to the supporting track members in the retracted elevated position.

Another object of this invention is to provide a compact carrier which easily and conveniently presents the spare tire in an accessible extended lowered position.

A further object of the invention is to provide an apparatus which provides a quick locking and unlocking mechanism which provides a high strength connection where the fabrication of the locking means is relatively simple.

Finally, it is an object of the invention to provide a spare tire carrier which is economical to manufacture, durable in use and efficient in operation.

SUMMARY OF THE INVENTION

According to the invention, an improved spare tire carrier is disclosed which is adapted for supporting a spare tire on an underside of a vehicle The carrier comprises a pair of track members for pivotably and slideably mounting a carriage adapted to receive the spare tire. The track members each have an inclined guide slot for receiving a pair of rollers mounted on each side of the carriage. The rollers are secured to the carriage approximately intermediate the front end and the rear end of the carriage to operably allow a lowered extended position of the carriage. The carriage is movable relative to the track members between a retracted elevated position and an extended lowered position.

Pins are provided to cooperate with guide slots in the track members for controlling and guiding the relative pivotable movement of the carriage to the track members between the retracted elevated position and extended lowered position. The guide slots cooperate with the pins secured to the carriage to pivot the carriage substantially horizontally in its retracted elevated position and to pivot the carriage downwardly when the carriage is in the extended lowered position.

According to the invention, an improved locking mechanism is also provided. A rotatable locking bar is positioned in a sleeve connected to the carriage. The locking bar is moved through the locking gate of the track members in a prearranged relationship with a track member locking device. The locking bar is then rotated 90° in a preselected direction to lock the carriage locking bar shoulder with the track member locking shoulder to operably prevent separation of the carriage and track member. A spring bias is applied to a padlock flange to maintain the locking bar in the locked position.

In another embodiment of the locking arrangement, the locking bar has special shaped ends which engage with and are captured within holes formed in the track members when the locking bar is moved longitudinally within the sleeve.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DETAILED DESCRIPTION OF THE INVENTION

Figure 1:
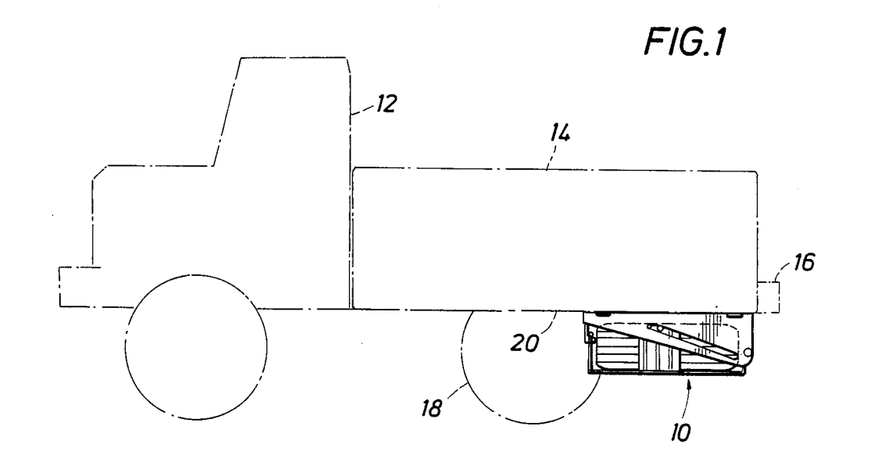
FIG. 1 is a side elevational view of the spare tire carrier of the invention installed on a truck.

The spare tire carrier of the present invention, indicated generally at 10 in FIG. 1, can be installed on a conventional pickup truck 12 shown in phantom lines. The truck 12 includes a rear box 14, a rear bumper 16, a rear wheel 18 and an underside 20. The underside 20 may be defined by the truck frame (not shown), bottom of the box 14 or any other structure associated below the box. Though the present invention is shown installed on a truck, other types of vehicles such as a van or any other vehicle whose underside would accept the present invention are included in its intended use.

Figures 2, 6, 7:
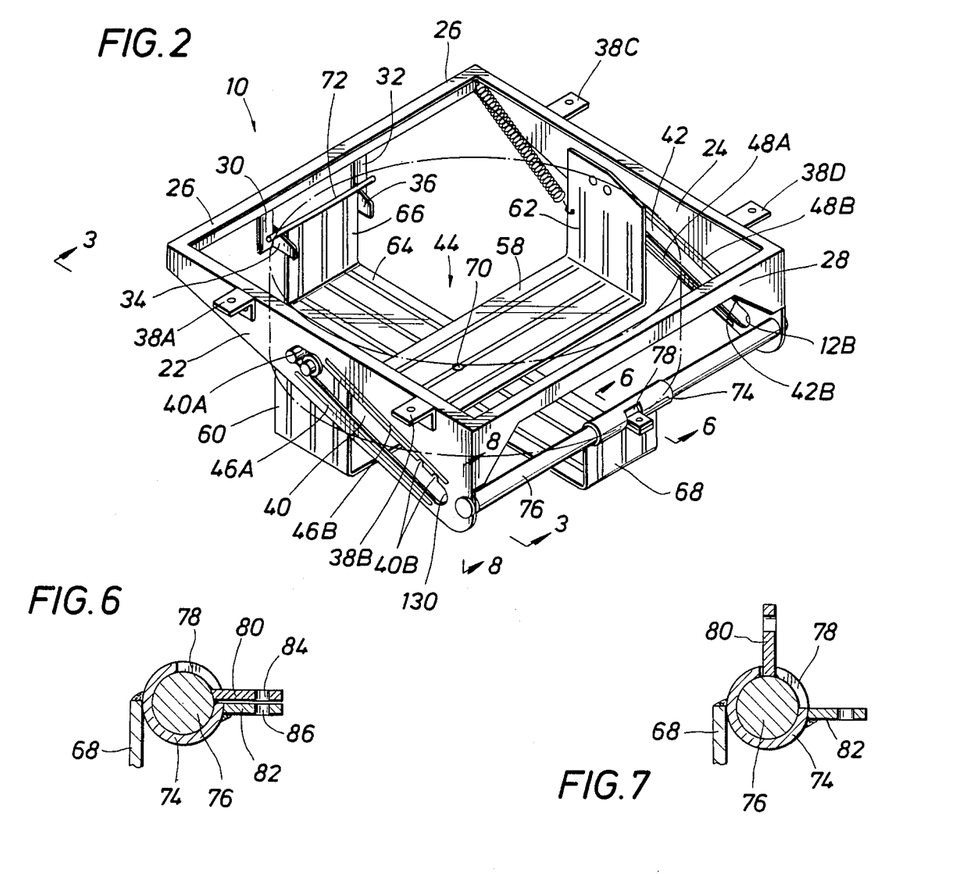
FIG. 2 is an enlarged perspective view of the spare tire carrier of the invention in the retracted elevated position.
FIG. 6 is an enlarged detail side sectional view of the locking means in the locked position taken along lines 6—6 of FIG. 2.
FIG. 7 is an enlarged detail side sectional view of the locking means similar to FIG. 6, but showing the locking means in the unlocked position as shown in FIG. 5.

Referring now to the perspective view of FIG. 2, the spare tire carrier 10 includes a tire support frame comprising a pair of supporting track members 22 and 24 spaced apart by front lateral member 26 and rear lateral member 28. The front lateral member 26 has spaced apart members 30 and 32 downwardly projecting to support inwardly directed ramp members 34 and 36, respectively. Angle irons 38A and 38B of track member 22 and angle irons 38C and 38D of track member 24 aid in mounting the spare tire carrier 10 to the underside 20 of the vehicle.

Inclined guide slots 40 and 42 are provided in track members 22 and 24, respectively. Guide slot 40 has a generally horizontal section 40A and a pair of notches 40B on each side for controlling and guiding the pivoting of the carriage 44 of the invention, as will be discussed further in detail. Guide slot 42 has a similar horizontal section (not shown) and pair of notches 42B.

Figures 5, 8:
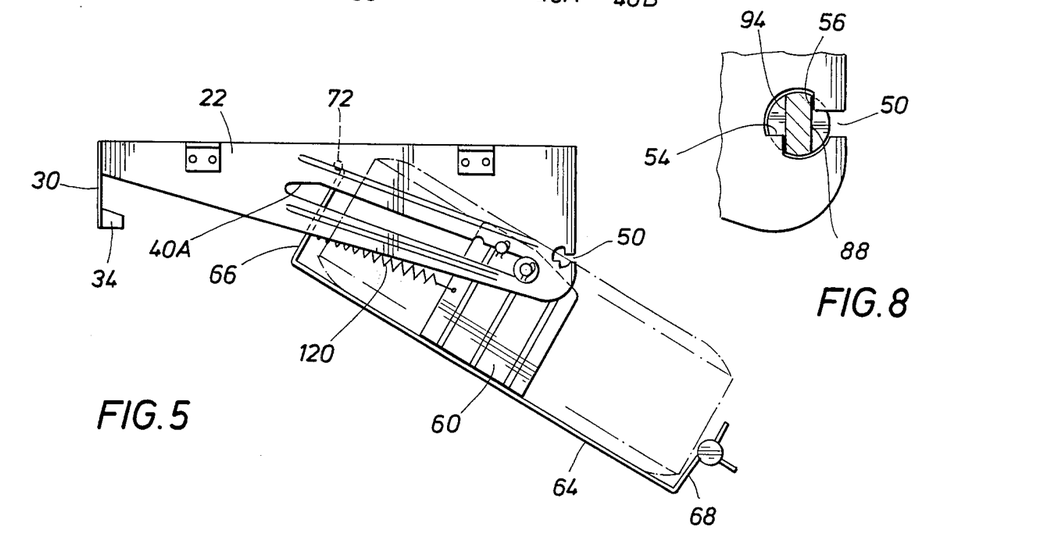
FIG. 5 is a side elevational view similar to FIG. 3, but showing the spare tire carrier in the projected or extended lowered position.
FIG. 8 is an enlarged detail side sectional view of the locking means of the present invention taken along lines 8—8 of FIG. 2 in the locked position.

The track members 22 and 24 include stiffening ribs 46A and 46B and 48A and 48B, respectively, to provide structural integrity to the spare tire carrier. As best shown in FIGS. 2, 5 and 8, each track member 22 and 24 has a locking gate 50 and 52. Locking gate 50 communicates with a retaining shoulder 54 and a locking shoulder 56, as best shown in FIG. 8, to provide an improved locking mechanism. Locking gate 52 has a similar retaining shoulder and locking shoulder (not shown) which will be discussed in the operation of the invention.

Figure 4:
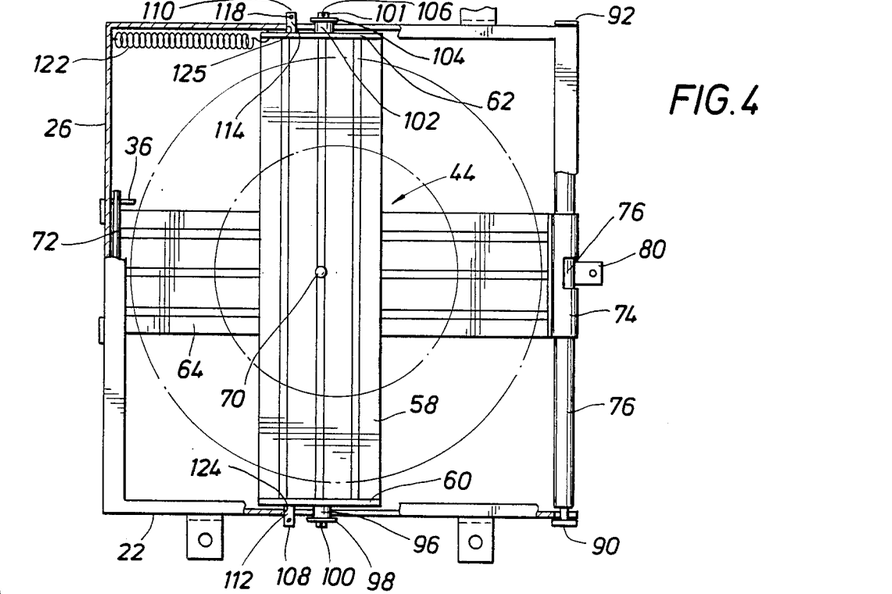
FIG. 4 is a plan view of the invention taken along lines 4—4 of FIG. 3.

As best shown in FIGS. 2 and 4, the carriage 44 comprises a lateral member 58 having upright ends 60 and 62 positioned perpendicular to a longitudinal member 64, which also has upright ends 66 and 68. The lateral member 58 and the longitudinal member 64 and the corresponding upright members are fabricated from galvanized or anodized steel with stiffening ribs parallel spaced therein for additional structural integrity. The lateral member 58 and the longitudinal member 64 are secured together by a conventional nut and bolt 70 with additional welding along the edge of the lateral member 58. In the alternative, the lateral and longitudinal members 58 and 64 can be fastened together by a sleeve welded to such members, and internally threaded to receive a threaded rod for fixing the spare tire within the carriage 44. The longitudinal member 64 has a supporting bar 72 connected at the top edge of front upright end 66 for supporting engagement with ramp members 34 and 36.

Longitudinal member 64 has a sleeve 74 fixedly welded to the top edge of rear upright end 68 for rotatably receiving therein a locking bar 76. The sleeve 74 has a sized opening 78 to allow a padlock flange 80 secured radially outwardly from the locking bar 76 to be rotated 90°. The padlock flange 80 is rotated from an unlocked position, shown in FIG. 7, to a locked position, as shown in FIG. 6, where the padlock flange 80 engages stationary flange 82 of sleeve 74. Apertures 84 and 86 of respective padlock flange 80 and stationary flange 82 are adapted to receive a conventional padlock for locking the apparatus. As best shown in FIG. 8, the locking bar 76 is grooved adjacent each end of the bar to provide a locking shoulder 88. As best shown in FIG. 4, circular flange members 90 and 92 resulting from the grooved ends aid in the locking. Shoulder 94 in combination with track member or retaining shoulder 54 of the locking bar 76 aids in the preselected direction of rotation of the locking bar 76 relative to the track member 22.

Figure 3:
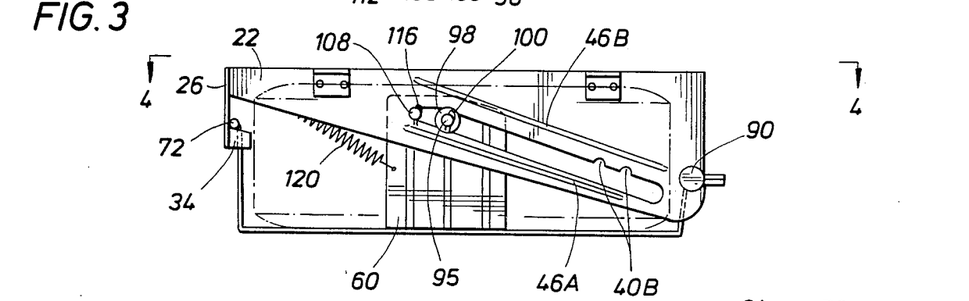
FIG. 3 is a side view of the invention taken along lines 3—3 of FIG. 2.

Turning now to FIGS. 3 and 4, the roller means of the invention is best shown. A shaft 95 on upright member 60 of lateral member 58 has a roller 96 secured thereon. Radially projecting flange 98, which has a greater diameter than the slot, is secured on the outside of the track member 22. A conventional locking pin 100 is provided in roller shaft 95 to secure the roller 96 and flange 98. Likewise, a shaft 101 on the upright 62 of lateral member 58 is provided with a roller 102 thereon having a radially projecting flange 104 secured by conventional locking pin 106. Guide pins 108 and 110 secured to respective uprights 60 and 62 preferably have respective rollers 112 and 114 thereon secured by conventional locking pins 116 and 118.

As best shown in FIGS. 3 and 4, springs 120 and 122 are connected between the uprights 60 and 62, respectively, to the front lateral member 26 for urging the carriage 44 to the retracted elevated position and to provide controlled downward sliding of the carriage to the extended lowered position. Preferably, the spring tension used for the combined springs 120 and 122 will reduce the force required to return the carriage to the retracted position but will not return it without the aid of the operator. This prevents an empty carriage from snapping back to a retracted position, causing the potential for injury to a person who may have hands or fingers in the travel path of the carriage.

Figure 9:
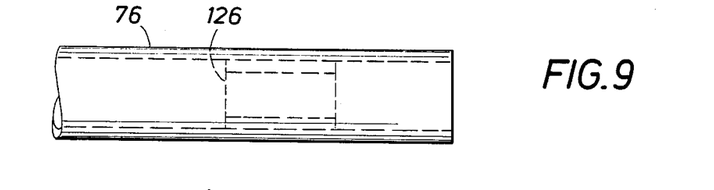
FIGS. 9-11 are respective side and side sectional views of the locking bar during various stages of construction.
Figure 10:
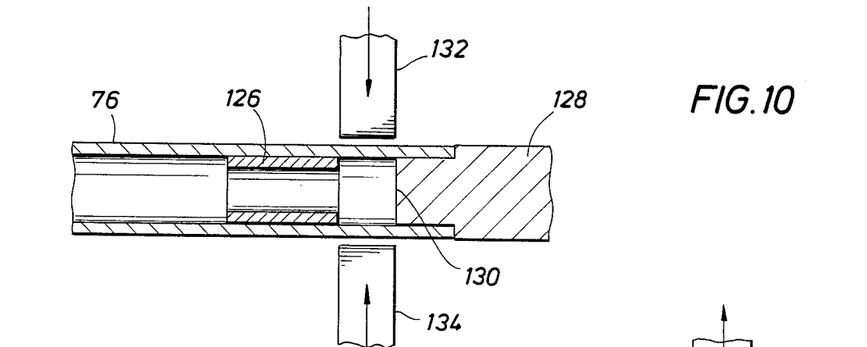
Figures 11, 12, 13:
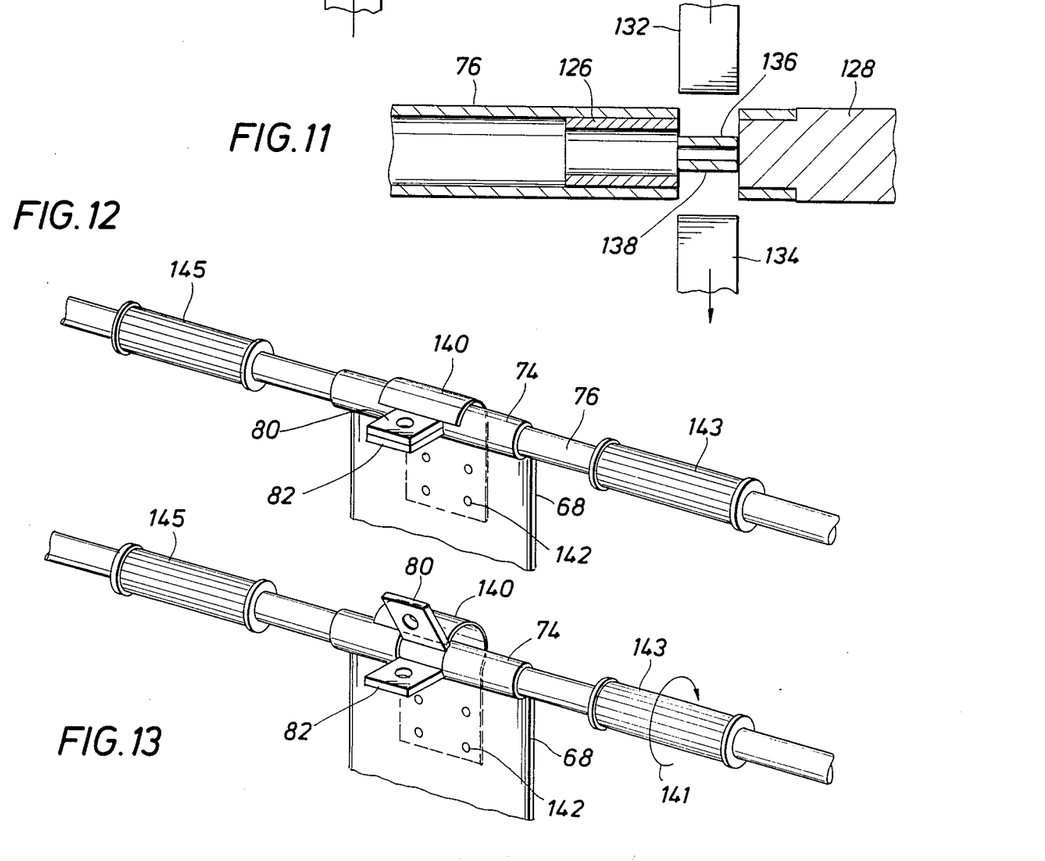
FIGS. 12 and 13 are perspective views of the spring bias means for maintaining the padlock flange in a predisposed position.
Figure 14:
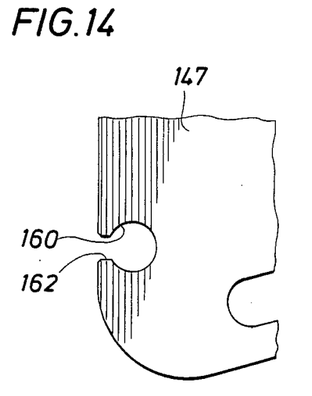
FIGS. 14 and 15 illustrate an alternative arrangement for locking the tire carriage to the track members.
Figure 15:
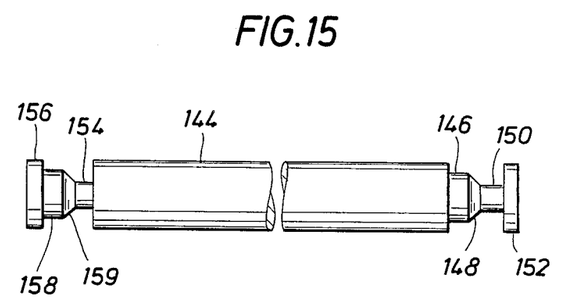

The locking bar 76 is constructed in the manner shown in FIGS. 9–11. In the preferred form of the invention, the locking bar 76 is constructed of a steel tubular of the desired length and diameter. A tubular stub insert 125 is press fit into the locking bar 76 a predetermined distance from the end of the locking bar tubular 76. The stub 126 provides additional strength to the locking bar tubular 76 to prevent deformation thereof during a subsequent punching process which forms the grooves on the ends.

In FIG. 10, a shouldered tool 128 is inserted into the end of the locking bar tubular (76) with the end 130 thereof spaced from the insert 125 a desired distance. A pair of flat-faced cutting punches 132 and 134 are oriented as shown in FIGS. 10 and 11, and forced together to shear a portion of the sidewalls of the locking bar tubular 76, as shown in FIG. 11. Opposing sidewall portions of the locking bar tubular are thus pressed together to form the grooves for engageably locking to the special-shaped openings within track members 22 and 24. The tool insert 128 can then be removed. The other end of the locking bar tubular is constructed in a comparable manner. With this method of construction, the locking ends remain round, despite the compressive punching operation to form the grooves. As noted in FIG. 11, the sidewall sections 136 and 138 are not pressed completely together, thereby leaving an aperture therebetween. This facilitates the draining of any anticorrosion solution in which the tire carrier of the invention may be initially dipped.

FIGS. 12 and 13 illustrate a spring bias means 140 which is effective to bias the padlock flange 80 against the stationary flange 82. In this manner, the locking bar 76 is biased in a position locked to the track members 22 and 24. The spring bias means 140 comprises a sheet of beryllium copper, formed with a curvature for accommodating the sleeve 74. The spring bias means is riveted 142, or otherwise fixed, to the rear upright end 68 of the tire carriage 44. FIG. 12 illustrates the locking bar biased by the spring member 140, while FIG. 13 illustrates the locking bar 76 rotated 141 to a position to release it from the track members 22 and 24. Hand grips 143 and 145 may be secured to the locking bar 76 on each side of the sleeve 74 to facilitate the twisting of the locking bar 76 to overcome the spring tension of the spring bias means 140, thereby effecting a release of the locking bar 76 from the track members 22 and 24.

FIGS. 14–17 illustrate another embodiment of a locking bar 144 effective for locking to the track members, one shown as reference character 147. The right hand side of the locking bar 144, for example, includes a round shoulder 146 formed in a taper 148 down to a smaller round section 150. A flat circular end stop 152 is formed integral with the smaller round section 150. The other end of the locking bar 144 is similarly constructed, but with the smaller round section 154 connected to the locking bar 144, and the stop flange 156 connected to the larger round section 158.

The track member 147 includes a hole 160 with a diameter in which the larger round shoulders 146 and 158 can snugly fit. An opening 162 is formed between the hole 160 and the edge of the track member member 147. The opening 162 is of sufficient size to accommodate the smaller round sections 150 and 154 of the locking bar 144. The other track member is comparably constructed.

Figure 16:
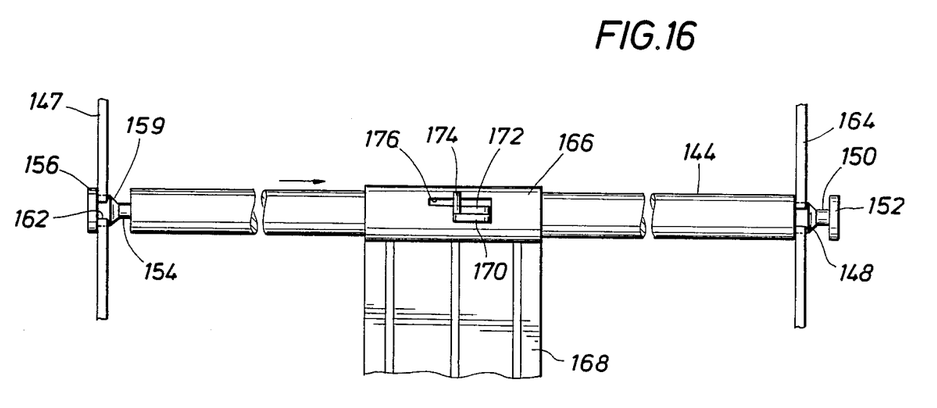
FIGS. 16 and 17 are elevational views of the positions of the locking bar according to the alternative locking arrangement.

FIG. 16 illustrates the construction of the tire carrier for allowing the longitudinal movement of the locking bar 144 to effect a lock to the track members 147 and 164. FIG. 16 illustrates the locking arrangement in the secured position where the locking bar 144 has been moved to the right, thereby engaging the larger round shoulder 158 in the hole 160 of the track member 147. In like manner, the larger round shoulder 146 is locked within the hole formed in the track member 164. The sleeve 166 of the rear upright end 168 includes a stationary flange 170 fixed to the sleeve 166, and a padlock flange 172 fixed to the locking bar 144. Each flange 170 and 172 includes a hole for locking by a padlock. The padlock flange 172 includes a vertical thumb piece 174 for use in pushing the locking bar 144 to the left or right. Formed in the sleeve 166 is a guide slot 176 for allowing the padlock flange 172 to move upwardly and then to the left, as shown in FIG. 16.

Figure 17:
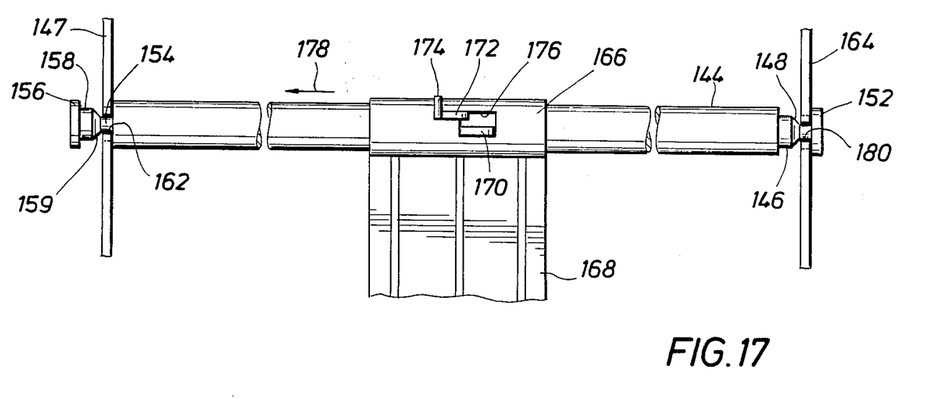

FIG. 17 illustrates the locking bar 144 after the padlock flange 172 has been rotated upwardly and moved to the left, as shown by arrow 178. In the unlocked position, the smaller round sections 150 and 154 of the locking bar 144 can pass freely through the openings 162 and 180 of the corresponding track members 147 and 164. As a result, the tire carriage can be disengaged from the track members 147 and 164, and then pulled by the hand grips 143 and 145 rearwardly to install or remove the tire.

In Operation

In operation of the preferred embodiment of the invention, the carriage 44 normally resides in its retracted elevated position on the underside 20 of the vehicle with the locking bar 76 in the locked position, as shown in FIGS. 1–4. In this position the guide pins 108 and 110 cooperate with the horizontal sections 40A and 42A, respectively, of the guide slots 40 and 42 to position the carriage in a substantially horizontal position.

The front supporting bar 72 rides up ramps 34 and 36 when the carriage 44 is in the retracted elevated position so as to releasably support and to aid in horizontally positioning the carriage relative to the track members. Guide pins 108 and 110 engage the abutment shoulders 124 and 126, respectively, of the track members to position the carriage locking bar shoulder in a prearranged relationship with the track member locking shoulder. The nonengagement positioning allows the locking bar to be easily rotated after it passes through the locking gates 50 and 52 without a friction force.

When it is desired to remove or replace a tire on the carriage 44, the padlock, if used, is removed from flanges 80 and 82 and the flange 80 is moved from the locked position to the unlocked position. This quick counterclockwise 90° rotation of the locking bar rotates the locking bar shoulder 88 from the locked position, shown in FIG. 8, engaging the locking shoulder 56 to align the locking bar shoulders 88 and 94 with the presized gate opening 50. The retaining shoulder 54 and locking bar shoulder 94 prevent further counterclockwise rotation of the locking bar to align the locking bar with the gate 50. The presized gate 50 is also designed to prevent rotation of the locking bar unless the locking bar shoulders 88 and 94 have cleared the gate 50. The similarly operated locking mechanisms associated with gate 50 and gate 52 at both ends of the locking bar aid in assuring complete make-up of the locking device.

The operator may then pull the locking bar 76 to roll the carriage under control to the extended lowered position, as shown in FIG. 5. The rollers 96 and 102 on the carriage allow pivoting and sliding movement of the carriage relative to the track members while the pins 108 and 110 control and guide the pivotable movement of the carriage relative to the track members.

When the carriage is in its extended lowered position, the pins 108 and 110 are received in one notch pair of respective notches 40B and 42B to pivot the carriage further downwardly. The pair of notches 40B and 42B on each side of the track members 22 and 24 permit the tire carriage to be extended into an intermediate lowered position without sliding into a full extended lowered position. Additional notches can be utilized for providing yet other intermediate positions. In the full extended lowered position, the rollers 96 and 102 simultaneously engage the abutment shoulders 130 and 128 of guide slots 40 and 42, respectively.

A spare tire carrier is disclosed which provides easy access for removal of the spare tire by the operator. The novel placement of the pivotable rollers approximately intermediate the front end and the rear end of the carriage operably allow a desirable extended lowered positioning of the carriage. As shown in FIGS. 3 and 5 the carriage is designed to be weighted to pivot clockwise so that guide pins 108 and 110 ride on the top of the guide slots to provide a controlled and guided movement of the carriage. The combination of the improved roller means and the locking means provides a safer and more convenient spare tire-carrier. Additionally, the springs 120 and 122 prevent abrupt and sudden movement of the carriage from the retracted elevated position to the extended lower position for additional safety of the operator after unlocking of the carrier.

Various modifications and alterations in the disclosed apparatus and methods will be apparent to those skilled in the art of the foregoing description which does not depart from the spirit and scope of the invention. For this reason, these changes are desired to be included in the appended claims. The appended claims recite only the limitation to the present invention in the descriptive manner which is employed for setting forth the embodiments and is to be interpreted as illustrative and not limitative.

What is claimed is:

1. Apparatus adapted for supporting a spare tire on an underside of a vehicle, comprising:
   a pair of spaced apart track members attachable to the underside of the vehicle, said track members each having an inclined path of travel;
   a carriage having a front end directed toward the front end of the vehicle, and a rear end directed toward the rear end of the vehicle, said front end and said rear end of said carriage being spaced apart a sufficient distance to enable attachment of a spare tire to said carriage;
   means for movably mounting said carriage to the inclined path of travel of said track members, said carriage being pivotally movable relative to said track members between a retracted tire storage position and an extended position for providing convenient access to the spare tire; and
   a guide pin fixed to said carriage and engageable with said inclined path of travel of said track members for limiting the pivotal movement of said carriage with respect to said track members.

2. The apparatus of claim 1 wherein said inclined path of travel comprises an inclined guide slot in each said track member, and said mounting means and said guide pins are each disposed in respective said guide slots.

3. The apparatus of claim 2 wherein each said guide pin cooperates with a respective said guide slot between said retracted position and said extended position.

4. The apparatus of claim 2 wherein at least one said track member guide slot includes an upper hroizontal section which cooperates with one said guide pin to fix said carriage to substantially a horizontal position when in said retracted elevated position.

5. The apparatus of claim 1 further comprising:
   at least one of said track members having a notch in said guide slot to cooperate with one said guide pin to allow said carriage to pivot downwardly somewhat when said carriage is in said extended lowered position.

6. The apparatus of claim 1 further comprising:
   a front means for releasably supporting said carriage with said track members, and
   a rear means for releasably supporting said carriage with said track members.

7. The apparatus of claim 6 wherein said front means comprises:
   a lateral member secured between said track members, said lateral member having an inclined ramp, and
   a supporting bar disposed on said carriage to engage said inclined ramp when said carriage is in said retracted elevated position.

8. The apparatus of claim 1 wherein said means for movably mounting is secured to said carriage approximately intermediate said front end and said rear end of said carriage so that said carriage can be rocked about a center of gravity when in said extended lowered position for easy access to said tire.

9. Apparatus adapted for supporting a spare tire in a balanced manner on an underside of a vehicle, comprising:
   a pair of spaced apart track members having means for attaching to the vehicle, each said track member having an inclined guide slot;
   a carriage adapted to receive the spare tire, said carriage having a front end directed toward the front of the vehicle and a rear end directed toward the rear of the vehicle;
   means located substantially intermediate the front end and the rear end of said carriage for pivotally mounting said carriage to said track members; and
   said pivotal mounting means including means for slideably mounting said carriage with respect to said inclined guide slots of said track members, said carriage thereby being movable relative to said track members between a retracted elevated position and an extended lowered position, and pivotal substantially about a center of gravity of said carriage at positions between said elevated position and said lowered position.

10. The apparatus of claim 9 wherein said slideably mounting means comprises two rollers each captured within a respective said track member guide slot.

11. The apparatus of claim 9 further including a pair of pins each fixed to a respective opposing side of said carriage and extending outwardly therefrom, and wherein each said track member guide slot cooperates with a respective said pin to limit pivotal movement of said carriage.

12. The apparatus of claim 11 further comprising:
said track members having a notch in said guide slots to cooperate with said pins to allow said carriage to pivot an additional amount when in said extended lowered position and to inhibit said slideable mounting means from freely sliding within said inclined guide slots.

13. The apparatus of claim 9, further comprising:
a front means for releasably supporting said carriage with said track members; and
a rear means for releasably supporting and locking said carriage with said track members.

14. The apparatus of claim 13 wherein said front supply means comprises:
a lateral member secured between said track members, said lateral member having an inclined ramp, a supporting bar disposed on said carriage to engage said inclined ramp when said carriage is in the said retracted elevated position.

15. The apparatus of claim 9 further comprising:
a transverse locking bar fixed to said carriage and extending from one said track member to the other said track member; and
means responsive to a movement of said locking bar for locking said carriage to said track members in said retracted elevated position.

16. Apparatus adapted for supporting a spare tire on an underside of a vehicle, comprising:
a pair of spaced apart track members having means for attaching to the vehicle, each said track member having an inclined guide slot;
a carriage adapted to receive the spare tire;
means for pivotally and slideably mounting said carriage with said track members, said carriage thereby being movable relative to said track members between a retracted elevated position and an extended lowered position;
at least one pin fixedly secured to said carriage to cooperate with one of said guide slots for controlling and guiding the relative pivotable movement of said carriage to said track members; and
said track member having a notch in said guide slot to cooperate with said pin to pivot an extended end of said carriage downwardly when said carriage is in said extended lowered position.

* * * * *

UNITED STATES PATENT AND TRADEMARK OFFICE
CERTIFICATE OF CORRECTION

PATENT NO. : 4,711,382

DATED : December 8, 1987

INVENTOR(S) : David L. Helterbrand

It is certified that error appears in the above-identified patent and that said Letters Patent is hereby corrected as shown below:

Col. 8, line 17, "hroizontal" should be --horizontal--.

Col. 9, line 27, "supply means" should be --support means--.

Signed and Sealed this

Twentieth Day of September, 1988

Attest:

DONALD J. QUIGG

Attesting Officer

Commissioner of Patents and Trademarks